UNITED STATES PATENT OFFICE.

JOHN D. PENNOCK, LOUIS C. JONES, AND FRED LESLIE GROVER, OF SYRACUSE, NEW YORK, ASSIGNORS TO THE SOLVAY PROCESS COMPANY, OF SOLVAY, NEW YORK, A CORPORATION OF NEW YORK.

PROCESS OF RECOVERING CONSTITUENTS OF VALUE FROM NATURAL ALKALINE DEPOSITS.

1,215,575.   Specification of Letters Patent.   Patented Feb. 13, 1917.

No Drawing.   Application filed January 14, 1916. Serial No. 72,032.

*To all whom it may concern:*

Be it known that we, JOHN D. PENNOCK, LOUIS C. JONES, and FRED LESLIE GROVER, citizens of the United States, residing at Syracuse, in the county of Onondaga and State of New York, have invented a new and Improved Process of Recovering Constituents of Value from Natural Alkaline Deposits, of which the following is a specification.

As is well known there are in the United States and elsewhere extensive natural deposits of salts, both in the solid form and in solution in alkaline lakes. Among these are constituents of value, such as soda, borax and potash, and the object of our improvements is to separate these from the accompanying impurities in a simple and efficient manner to the end of recovering them in a commercially pure condition.

In describing our invention we shall speak of the process as beginning with the treatment of a solution of the salts such, for example, as is found in the form of alkaline lakes. Such a solution may however be formed by dissolving the mixed salts in water and thus solid deposits thereof can be equally well utilized, and we wish it to be understood that where we use herein the term "lake water" or "lake liquor" we intend to include therein any solution formed from a solid alkaline deposit.

In carrying our invention into effect the solution to be treated is, if necessary, concentrated by evaporation to such a point, or is formed of such concentration that practically all the contained sodium carbonate can be removed through treatment with carbon dioxid. We have found that a brine containing in solution 50 grams per liter $Na_2CO_3$, 50 grams per liter $KCl$, 210 grams per liter $NaCl$, 80 grams per liter $Na_2SO_4$ and 20 grams per liter $Na_2B_4O_7$ precipitates 95 per cent. of the originally contained carbonate on carbonation.

The solution is, after settling to remove any organic or other suspended solid matter, carbonated with carbon dioxid gas, or a gas containing carbon dioxid, as kiln gas, until precipitation of sodium bicarbonate is complete, as indicated by the reaction

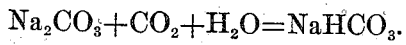

$$Na_2CO_3 + CO_2 + H_2O = NaHCO_3.$$

This precipitate is filtered off and washed, and may be sold as such or calcined and sold as soda ash ($Na_2CO_3$). A progressive separation of the salts remaining in the liquor after the bicarbonate is filtered off is then effected by evaporation and concentration as follows:

The liquor is concentrated by evaporation and in the first instance sodium sulfate and sodium chlorid are thrown down and are continually removed as solid salts and rejected. When a certain point of concentration is reached potassium sulfate is also thrown down and the precipitate is then preserved and set aside for use as hereinafter described. The precipitated potassium sulfate is not pure but is associated with sodium sulfate in the mixture known as "glaserite." The potassium sulfate, however, largely predominates and is the essential constituent and we have herein and in the appended claims spoken of the entire precipitate as potassium sulfate. Some sodium chlorid will also be precipitated at this time and be present. The evaporation is continued until a point of concentration is reached at which potassium chlorid just begins to be precipitated, when evaporation is stopped and the solution is allowed to cool.

In conducting the above described part of the process regard should be had to the temperature of the solution in order to retard the precipitation of the more soluble salts, potassium sulfate and potassium chlorid. Thus if, at first, the evaporation is effected at a relatively low temperature it should be raised before the potassium sulfate begins to precipitate and may be raised still higher in order to retard the precipitation of the potassium chlorid.

In general terms, in order to make the recovery as complete as possible, the solution should be raised to and maintained at a high temperature. Good results are attained by a temperature of 83° C., before potassium sulfate begins to precipitate and this may be increased to as high as 112° C. or even higher, though we do not limit ourselves to the use of any specific temperature.

The solution from which the sodium sulfate and chlorid and potassium sulfate have been precipitated out is cooled to approximately 25° C., and upon cooling practically pure potassium chlorid and borax $(Na_2B_4O_7.10H_2O)$ are precipitated in mixture to be afterward separated. If desired a more complete precipitation of the potassium chlorid and freedom of the precipitated crystals from sulfate of sodium, may be effected by adding to the solution, a solution of sodium chlorid in water, though this is not essential to the opertaion of the process. A suitable proportion of sodium chlorid to be added to effect the desired result is 18 parts of sodium chlorid dissolved in 27 parts of water to each 690 parts of the solution.

In this operation substantially one-third of the potassium content of the batch of lake water treated is precipitated and recovered as potassium sulfate, one third is precipitated from the cooled solution as potassium chlorid and one third remains in solution in the mother liquor.

In order to effect the repetition and continuation of the process with constant recovery of the entire potassium content of each batch of lake water treated, in the form of potassium chlorid, we form a solution with a fresh batch of carbonated lake water, from which the sodium bicarbonate has been removed by precipitation and filtration, of such composition that upon evaporation at high temperature and removal of the precipitated salts all the contained sulfate radical will be precipitated so as to leave in solution approximately double the equivalent of the entire potassium constituent of the fresh batch of lake water.

In order to accomplish this we add to the mother liquor of the preceding operation from which potassium chlorid and borax have been precipitated, the potassium sulfate thrown down in that operation and reserved for the purpose, and add to this such quantity of carbonated lake water as will give the necessary proportions. The quantity of lake water required (of constant composition) will be the same in each repetition of the process. Upon evaporating at a high temperature, as before, sodium sulfate and chlorid are first precipitated and constantly removed. On continuing the evaporation a concentration of potassium is reached at which the solution becomes saturated with potassium sulfate and potassium sulfate begins and continues to be precipitated until practically all of the sulfate radical is removed at the high temperature and the balance of the potassium constituent is left in solution. Substantially one-half of this, which is the equivalent of the potassium constituent of the fresh batch of lake water introduced, is then precipitated upon cooling as potassium chlorid and the solution for the following operation is constituted as before. The presence or proportions of tetraborate of sodium is disregarded in forming the solution.

We have found in one experiment that, upon mixing 1650 parts of carbonated lake liquor with 417 parts of the precipitated potassium sulfate material and 644 parts of the mother liquor, after evaporation of 382 parts of water 432 parts of mixed sodium sulfate and chlorid were precipitated. Upon further evaporation of 790 parts of water 360 parts of mixed potassium sulfate and sodium chlorid were thrown out leaving in solution 131 parts of potassium chlorid of which 56 parts were (with addition of sodium chlorid and water) precipitated upon cooling.

There remains to an economic recovery in commercial form of the components of value a separation of the mixed potassium chlorid and borax precipitated from the cooled solution as above described.

This may be accomplished by the method described in an application for Letters Patent heretofore filed by us, December 16, 1915, Serial No. 67,141.

A desirable continuous cyclic method of effecting the separate recovery of the potassium chlorid and borax from the mixture thereof is as follows:

A solution consisting approximately of 23.6 per cent. potassium chlorid, 8.6 per cent. sodium tetraborate and 67.8 per cent. of water is formed, and this is concentrated at a high temperature (82° C. and upward) until completely saturated with potassium chlorid at the temperature employed. The potassium chlorid-borax mixture derived from the preceding steps of the process is then added to the solution in such quantity as to just saturate the solution with sodium tetraborate at the temperature employed. That is to say, enough is added to pass through the solution as much potassium chlorid as possible without causing precipitation of borax at the temperature employed.

It will be evident that the quantity of the mixed salts which may be added will vary with the temperature of the solution, the higher the temperature the greater being the permissible quantity of the salts.

The solution is allowed to stand until equilibrium has been attained, when the pure potassium chlorid thrown out is filtered off hot.

Enough water is then added to prevent the precipitation of potassium chlorid when the solution is cooled and the solution is cooled to approximately 28° C. with consequent crystallization of borax in a pure state.

The borax crystals are then filtered out and the solution is heated to evaporate the water added as above stated. Thus a solution is obtained of the same quantity and composition as that to which the potassium chlorid-borax mixture was added in the first instance. To this a fresh batch of the potassium chlorid-borax mixture is added and the operation is repeated as before.

Thus the process is continued with recurring additions of the mixture of potassium chlorid and borax received from the first part of the process and recovery of corresponding quantities of commercially pure potassium chlorid and borax from the solution.

In this manner by the recurrent alternate precipitation of potassium chlorid from the hot solution and of borax from the cooled solution these salts are separated and each is recovered in a commercially pure state.

From the foregoing it will be seen that our invention provides a practical, efficient and economical means of recovering the constituents of value from alkaline deposits in commercial form, the advantages of which will be readily understood by those skilled in the art.

We do not claim herein the specific method of separating the potassium chlorid and borax above described but have made this the subject of a separate application for Letters Patent, Serial No. 119,629, filed September 12, 1916, as a division hereof.

What we claim as new and desire to secure by Letters Patent is:—

1. The process of recovering components of value from alkaline lake water which consists in removing the sodium carbonate by carbonation and precipitation, then evaporating and concentrating the solution at a high temperature to precipitate, first, sulfate and chlorid of sodium and removing the precipitate as formed, and then potassium sulfate and sodium chlorid, leaving potassium chlorid in solution and finally cooling the solution to effect precipitation of potassium chlorid and borax.

2. The process of recovering components of value from alkaline lake waters which consists in forming a solution, including the batch of lake water to be treated freed from sodium carbonate, of such composition that upon concentration by evaporation at high temperature with removal of the precipitated salts all the sulfate radical will be precipitated so as to leave in solution approximately double the equivalent of the potassium content of the lake water in the batch, concentrating such solution by evaporation so as to precipitate first sodium sulfate and chlorid and removing these, and then precipitating and removing potassium sulfate and sodium chlorid, leaving in solution potassium chlorid.

3. The process of recovering components of value from alkaline lake waters which consist in forming a solution, including the batch of lake water to be treated freed from sodium carbonate, of such composition that upon concentration by evaporation at a high temperature all the sulfate radical will be precipitated so as to leave in solution approximately double the equivalent of the potassium content of the lake water in the batch, then concentrating such solution by evaporation at a high temperature with removal of the precipitated salts and finally cooling to precipitate potassium chlorid.

4. The process of recovering constituents of value from alkaline lake waters which consists in forming a solution containing potassium sulfate, potassium chlorid and sodium chlorid and adding thereto such quantity of carbonated lake water that upon concentration by evaporation at a high temperature all the sulfate radical will be precipitated so as to leave in solution approximately double the equivalent of the potassium content of the introduced lake water, concentrating the solution by evaporation at a high temperature to precipitate, first, sodium sulfate and chlorid and removing these and then precipitating and removing potassium sulfate and sodium chlorid, leaving potassium chlorid in solution and finally cooling the solution to precipitate the salts whose solubilities are exceeded by cooling.

5. The process of recovering constituents of value from alkaline waters which consists in carbonating the water to remove sodium carbonate and then treating it so as to effect the precipitation of potassium sulfate and sodium chlorid and removing these leaving potassium chlorid in solution, cooling the solution to precipitate, in the form of potassium chlorid, the equivalent of the potassium content of the alkaline water treated and adding to the mother liquor the precipitated mixture of potassium sulfate and sodium chlorid and a fresh batch of carbonated alkaline water to form a solution for repeating the process.

In testimony whereof, we have hereunto subscribed our names, this 12th day of January A. D., 1916.

JOHN D. PENNOCK.
LOUIS C. JONES.
FRED LESLIE GROVER.

Witnesses:
H. W. JORDAN,
H. DUANE BRUCE.